United States Patent
Yoon

(10) Patent No.: US 10,935,410 B2
(45) Date of Patent: Mar. 2, 2021

(54) APPARATUS AND METHOD FOR DETECTING INFLOW OF WATER INTO BATTERY SYSTEM, AND VEHICLE SYSTEM

(71) Applicants: HYUNDAI MOTOR COMPANY, Seoul (KR); KIA MOTORS CORPORATION, Seoul (KR)

(72) Inventor: Jong Hu Yoon, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 401 days.

(21) Appl. No.: 15/961,117

(22) Filed: Apr. 24, 2018

(65) Prior Publication Data
US 2019/0178697 A1  Jun. 13, 2019

(30) Foreign Application Priority Data
Dec. 13, 2017  (KR) .................. 10-2017-0171163

(51) Int. Cl.
*G01F 23/24* (2006.01)
*H02J 7/00* (2006.01)
*H01M 10/613* (2014.01)
*H01M 10/00* (2006.01)

(52) U.S. Cl.
CPC .......... *G01F 23/241* (2013.01); *H01M 10/00* (2013.01); *H01M 10/613* (2015.04); *H02J 7/0029* (2013.01); *H02J 7/0047* (2013.01)

(58) Field of Classification Search
CPC .......................... G01F 23/241; H01M 10/613
USPC ........................................................ 320/136
See application file for complete search history.

(56) References Cited

U.S. PATENT DOCUMENTS

| 3,648,189 | A | * | 3/1972 | Marchetti | ............. | H02J 7/0088 320/159 |
| 4,121,457 | A | * | 10/1978 | Yoshida | ................ | G01F 23/241 340/604 |
| 2011/0177415 | A1 | * | 7/2011 | Harrington | ....... | H01M 8/04559 429/432 |
| 2012/0073366 | A1 | * | 3/2012 | Molinaro | ............. | G01F 23/244 73/304 R |
| 2012/0132286 | A1 | * | 5/2012 | Lim | .................... | H01M 2/1072 137/1 |

(Continued)

FOREIGN PATENT DOCUMENTS

| CN | 102171877 A | 8/2011 |
| CN | 103616056 A | 3/2014 |
| JP | 2007-218740 A | 8/2007 |

(Continued)

OTHER PUBLICATIONS

Chinese Office Action dated Nov. 20, 2020 from the corresponding Chinese Application No. 2018104497026, 21 pp.

*Primary Examiner* — Jerry D Robbins
(74) *Attorney, Agent, or Firm* — Brinks Gilson & Lione

(57) ABSTRACT

An apparatus and a method for detecting water flowing into a battery system is disclosed. The apparatus includes a detection circuit unit to output different voltage values based on a level of water flowing into the battery system, and a water inflow determining unit to measure a voltage value output from the detection circuit unit and to determine a water inflow state of the battery system based on the measured voltage value.

19 Claims, 11 Drawing Sheets

(56) References Cited

U.S. PATENT DOCUMENTS

2015/0308877 A1* 10/2015 Faraldi .................... G01F 23/24
73/304 R

FOREIGN PATENT DOCUMENTS

| JP | 5305390 B2 | 10/2013 |
| KR | 10-1475917 B1 | 12/2014 |

* cited by examiner

US 10,935,410 B2

APPARATUS AND METHOD FOR DETECTING INFLOW OF WATER INTO BATTERY SYSTEM, AND VEHICLE SYSTEM

CROSS-REFERENCE TO RELATED APPLICATION

This application claims priority to and the benefit of Korean Patent Application No. 10-2017-0171163, filed on Dec. 13, 2017, which is incorporated herein by reference in its entirety.

FIELD

The present disclosure relates to an apparatus and a method for detecting water flowing into a battery system, and a vehicle system.

BACKGROUND

The statements in this section merely provide background information related to the present disclosure and may not constitute prior art.

Electric vehicles are supplied power by using a high-voltage battery system. The battery systems of the electric vehicles are mostly mounted on lower surfaces of the electric vehicles, and may be classified into an air cooling type and a water cooling type according to a cooling method.

In the air cooling battery system, water may be introduced through an inlet duct, and in preparation for the introduction of water, a spacing distance of the battery module from the bottom is guaranteed or safety is guaranteed by applying a drain hole (a water drain). Meanwhile, when the drain hole is blocked by foreign substances, the interior of the battery system may be filled with water, which may cause ignition or explosion of the battery.

Meanwhile, the water cooling battery system cools the battery by using cooling water, and generally employs a watertight structure so that introduction of water from the outside may be interrupted. However, we have discovered that due to the cracks or damages of the interior of the battery system, the cooling water may be leaked, and in this case, the battery may be ignited or exploded.

SUMMARY

The present disclosure provides an apparatus and a method for detecting water flowing into a battery system, and a vehicle system.

The technical objects of the present disclosure are not limited to the above-mentioned one, and the other unmentioned technical objects will become apparent to those skilled in the art from the following description.

In accordance with an aspect of the present disclosure, an apparatus for detecting water flowing into a battery system may include: a detection circuit unit configured to output different voltage values based on a level of water flowing into the battery system, and a water inflow determining unit configured to measure a voltage value output from the detection circuit unit and to determine a water inflow state of the battery system based on the measured voltage value.

The detection circuit unit may include a first water level detector including a plurality of first conductors disposed at different heights of one side of a pipe structure, a second water level detector including a plurality of second conductors disposed at different heights of the other side of a pipe structure, and a first resistor module having a total resistance value which varies as the water flowing into the pipe structure reaches a water level corresponding to the heights of the plurality of first conductors.

The plurality of second conductors may be disposed at the same height as the height of the plurality of first conductors.

A first conductor and a second conductor of the first water level detector and the second water level detector are respectively disposed at heights corresponding to the corresponding water levels, and may be short-circuited when the level of the water flowing into the pipe structure reaches a specific water level.

The first resistor module may include a plurality of resistors disposed between the plurality of first conductors.

The plurality of resistors may be connected to each other in series.

The apparatus may further include a second resistor module including a resistor disposed above a second conductor which is disposed at an uppermost height among the plurality of second conductors.

The detection circuit unit may output a voltage value corresponding to a combined resistance value of a resistance value of the first resistor module and a resistance value of the second resistor module based on a level of the water flowing into the pipe structure.

The detection circuit unit may output a voltage value corresponding to a resistance value of the first resistor module when no water is flowing into the pipe structure.

The pipe structure may include a plurality of pipes disposed parallel to each other, and the plurality of pipes are communicated with each other in a vertical direction.

The water inflow determining unit may determine a level of the water flowing into the battery system based on the measured voltage value, and may output a warning signal corresponding to the determined level of the water.

The water inflow determining unit may restrict output of battery power of the battery system based on the determined level of the water.

A relay of the battery system may be switched off according to the determined level.

In another form of the present disclosure, a method for detecting water flowing into a battery system may include the steps of: outputting, by a detection circuit unit, different voltage values based on a level of water flowing into the battery system, measuring by a water inflow determining unit, the output voltage value, and determining by the water inflow determining unit, a water inflow state of the battery system based on the measured voltage value.

The step of determining the water inflow state may include determining a level of the water flowing into the battery system based on the measured voltage value.

The method may further include outputting by the water inflow determining unit, a warning signal corresponding to the determined level of the water.

The method may further include restricting, by the water inflow determining unit, output of battery power of the battery system based on the determined level of the water.

The method may further include switching off, by the water inflow determining unit, a relay of the battery system based on the determined level of the water.

In accordance with another aspect of the present disclosure, a vehicle system may include: a battery system configured to provide an operational power source of a vehicle; a water inflow detecting device configured to measure a voltage value output from a detection circuit unit that outputs different voltage values based on a level of water flowing into the battery system and to determine a water inflow state of the battery system based on the measured voltage value; and a battery management system configured to output a warning signal to an input/output interface based on the determined water inflow state of the battery system.

The battery system may restrict output of battery power of the battery system based on the determined water inflow state of the battery system and may switch off a relay of the battery system.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
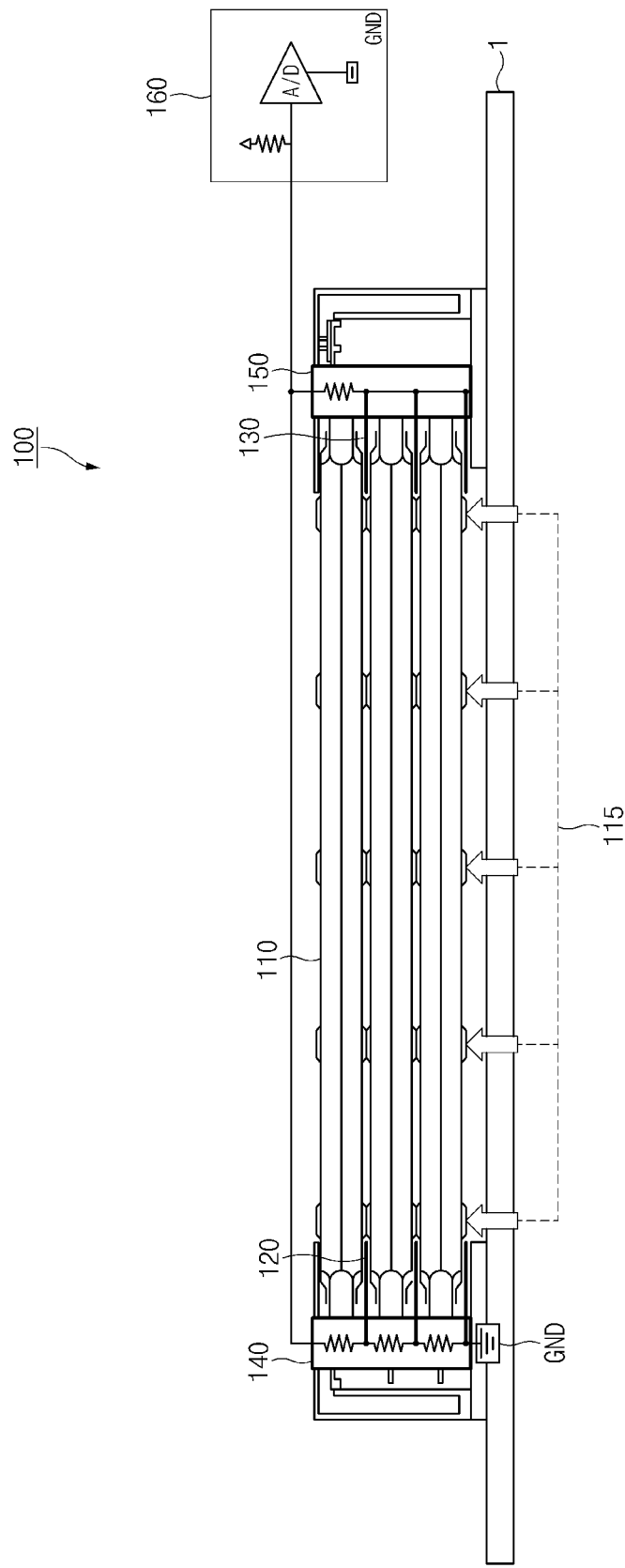
FIG. 1 is a block diagram illustrating a configuration of an apparatus for detecting water flowing into a battery system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. Exemplary forms of the present disclosure will be described in detail with reference to the accompanying drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. The terms are provided only to distinguish the elements from other elements, and the essences, sequences, orders, and numbers of the elements are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

FIG. 1 is a block diagram illustrating a configuration of an apparatus for detecting water flowing into a battery system in one form of the present disclosure.

Referring to FIG. 1, the apparatus for detecting water flowing into a battery system (hereinafter, referred to as 'a water inflow detecting apparatus') 100 may include a detection circuit unit and a water inflow determining unit 160.

Further, the detection circuit unit may include a first water level detector 120, a second water level detector 130, a first resistor module 140, and a second resistor module 150. Then, the first water level detector 120 and the first resistor module 140 may be disposed on one side of a pipe structure 110, and the second water level detector 130 and the second resistor module 150 may be disposed on the other side of the pipe structure 110.

Here, the pipe structure 110 is an nonconductor, and is equipped with a water inflow hole 115 so that water inflow into the battery system may be inflow into the pipe structure 110 through the water inflow hole 115.

The pipe structure 110 may include a plurality of pipes. The lengthwise directions of the plurality of pipes are disposed in a direction that is parallel to a bottom surface 1, and the pipes may be communicated with each other in a vertical direction. Then, each of the pipes includes a plurality of water inflow holes 115, and may be coupled such that adjacent water inflow holes face each other.

As an example, FIG. 1 illustrates one form of the pipe structure 110 in which three pipes are coupled in an upward direction, and for convenience of description, a pipe disposed on the bottom surface 1 is referred to as a first pipe, a pipe disposed above the first pipe is referred to as a second pipe, and a pipe disposed above the second pipe is referred to as a third pipe. Of course, although FIG. 1 illustrates the pipe structure 110 in which the three pipes are coupled to each other, the pipe structure 110 is a simple form and is not limited to any one form.

Here, each of the first to third pipes includes a plurality of water inflow holes 115, and may be coupled to each other such that the water inflow holes 115 of adjacent pipes face each other. Accordingly, when water is flowing into the battery system, water is introduced through the water inflow hole 115 of the first pipe first and water may be introduced sequentially through the water inflow holes 115 of the second pipe and the third pipe as the level of the water rises.

The first water level detector 120 and the second water level detector 130 may include a plurality of conductors.

First, the plurality of first conductors of the first water level detector 120, for example, conductor 1-1 121, conductor 1-2 122, and conductor 1-3 123 may be disposed on one side of the first to third pipes, and the conductors may be disposed between the first to third pipes.

As an example, conductor 1-1 121 may be disposed at a height corresponding to a first step water level. Then, conductor 1-1 121 may be disposed between the bottom surface 1 and the first pipe to detect a water inflow state and the first step water level.

Conductor 1-2 122 may be disposed at a height corresponding to a second step water level. Then, conductor 1-2 122 may be disposed between the first pipe and the second pipe to detect a second step water level.

Conductor 1-3 123 may be disposed at a height corresponding to a third step water level. Then, conductor 1-3 123 may be disposed between the second pipe and the third pipe to detect a third step water level.

The plurality of second conductors of the second water level detector 130, for example, conductor 2-1 131, conductor 2-2 132, and conductor 2-3 133 may be disposed on the other side of the first to third pipes, and the conductors may be disposed between the first to third pipes.

As an example, conductor 2-1 131 may be disposed between the bottom surface 1 and the first pipe to detect a water inflow state and the first step water level. Here, conductor 2-1 131 is disposed at the same height as that of conductor 1-1 121. Accordingly, when the water flowing into the pipe structure 110 reaches the first step water level, conductor 1-1 121 and conductor 2-1 131 may be short-circuited by the introduced water.

Then, conductor 2-2 132 may be disposed between the first pipe and the second pipe to detect a second step water level. Here, conductor 2-2 132 is disposed at the same height as that of conductor 1-2 122. Accordingly, when the water flowing into the pipe structure 110 reaches the second step water level, conductor 1-2 122 and conductor 2-2 132 may be short-circuited by the introduced water.

Then, conductor 2-3 133 may be disposed between the second pipe and the third pipe to detect a third step water level. Here, conductor 2-3 133 is disposed at the same height as that of conductor 1-3 123. Accordingly, when the water flowing into the pipe structure 110 reaches the third step water level, conductor 1-3 123 and conductor 2-3 133 may be short-circuited by the introduced water.

The first resistor module 140 may include a plurality of resistors, for example, a first resistor, a second resistor, and a third resistor.

The first to third resistors are connected to each other in series, and may be disposed on one side of the first to third pipes. Here, the plurality of resistors may be disposed between the plurality of first conductors.

As an example, one end of the first resistor is connected to a ground terminal of the bottom surface 1, and an opposite end of the first resistor is connected to the second resistor. Then, conductor 1-1 121 may be connected between one end of the first resistor and the ground terminal. Further, one end of the second resistor is connected to an opposite end of the first resistor and an opposite end of the second resistor is connected to the third resistor. Then, conductor 1-2 122 may be connected between an opposite end of the first resistor and one end of the second resistor. Further, one end of the third resistor is connected to an opposite end of the second resistor and an opposite end of the third resistor is connected to the water inflow determining unit 160. Then, conductor 1-3 123 may be connected between an opposite end of the second resistor and one end of the third resistor.

The second resistor module 150 may include a fourth resistor. The fourth resistor may be disposed on the other side of the first to third pipes.

As an example, one end of the fourth resistor is connected to conductor 2-1 131, conductor 2-2 132, and conductor 2-3 133, and an opposite end of the fourth resistor may be connected to the water inflow determining unit 160. Further, an opposite end of the fourth resistor may be electrically connected to an opposite end of the third resistor.

Here, the fourth resistor may be disposed above the one of the plurality of second conductors of the uppermost height, that is, conductor 2-3 133. [00 62] The water inflow determining unit 160 measures an output voltage of the detection circuit unit, and identifies a water inflow state of the battery system based on the measured voltage.

In the detection circuit unit, conductor 1-1 121 and conductor 2-1 131, conductor 1-2 122 and conductor 2-2 132, or conductor 1-3 123 and conductor 2-3 133 are short-circuited according to the level of the water flowing into the pipe structure 110. Then, as the water flowing into the pipe structure 110 reaches a water level corresponding to a location of the first conductor, the resistance value of the first resistor module vary. Accordingly, the detection circuit unit outputs voltages of different values according to the resistance values of the first resistor module.

The water inflow determining unit 160 determines the level of water flowing into the battery system according to the value of the output voltage output by the detection circuit unit, and performs an alarm or a control according to the determination result.

Figure 2:
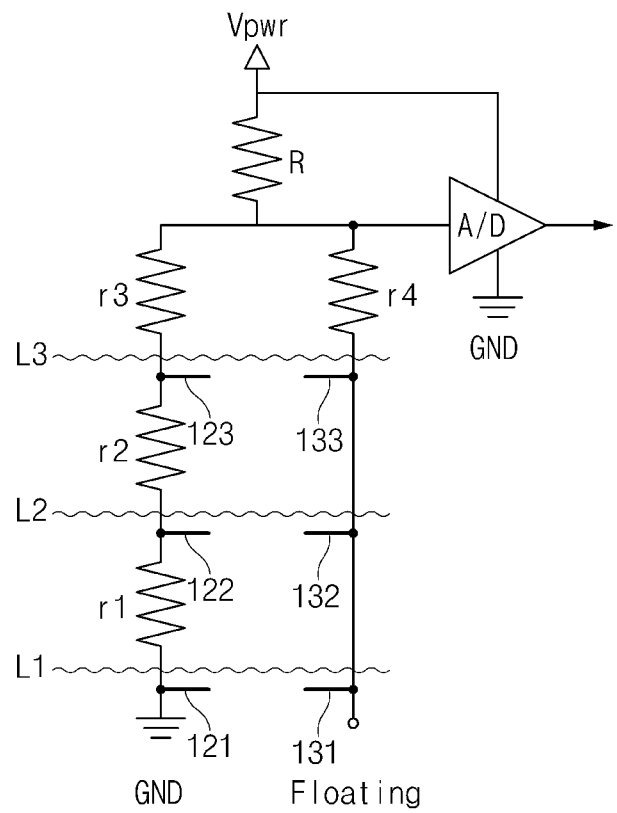
FIG. 2 is a block diagram illustrating a configuration of a circuit of an apparatus for detecting water flowing into a battery system.

The apparatus 100 for detecting water flowing into a battery system according to FIG. 1 may be represented by a circuit structure of FIG. 2.

Figure 3A:
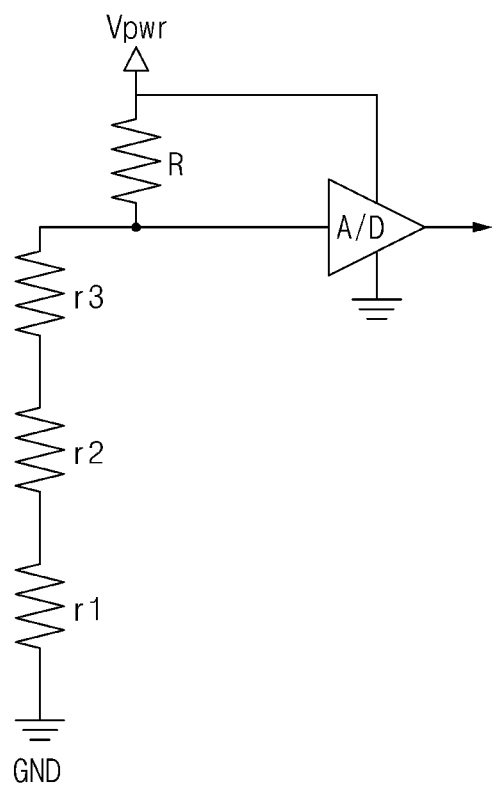
FIGS. 3A to 3D are views illustrating a circuit structure according to a level of water flowing into a battery system.
Figure 3B:
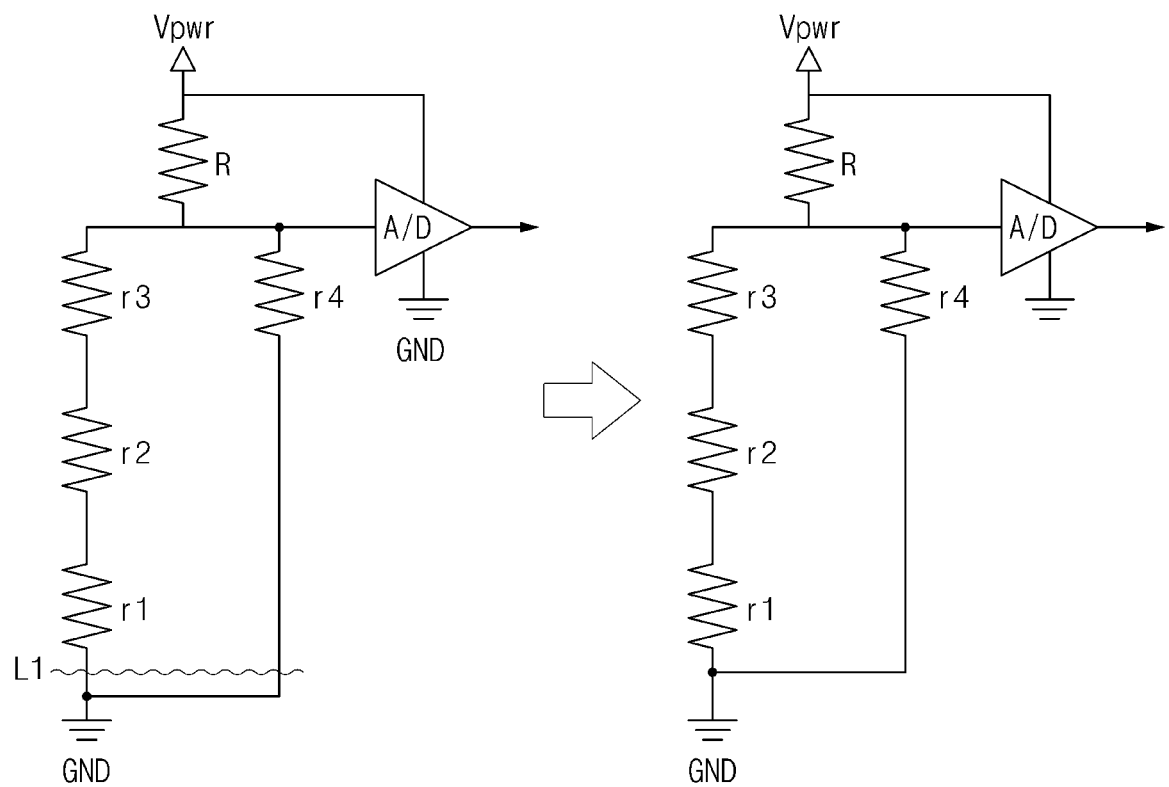
Figure 3C:
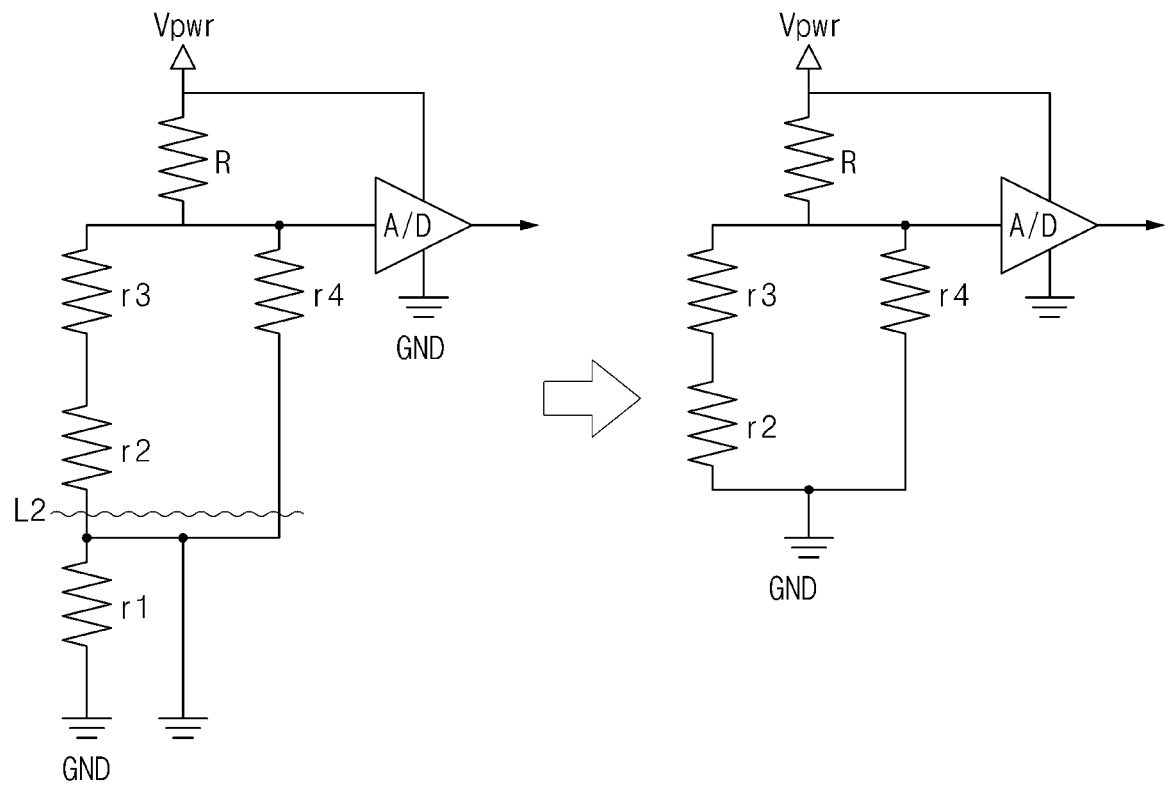
Figure 3D:
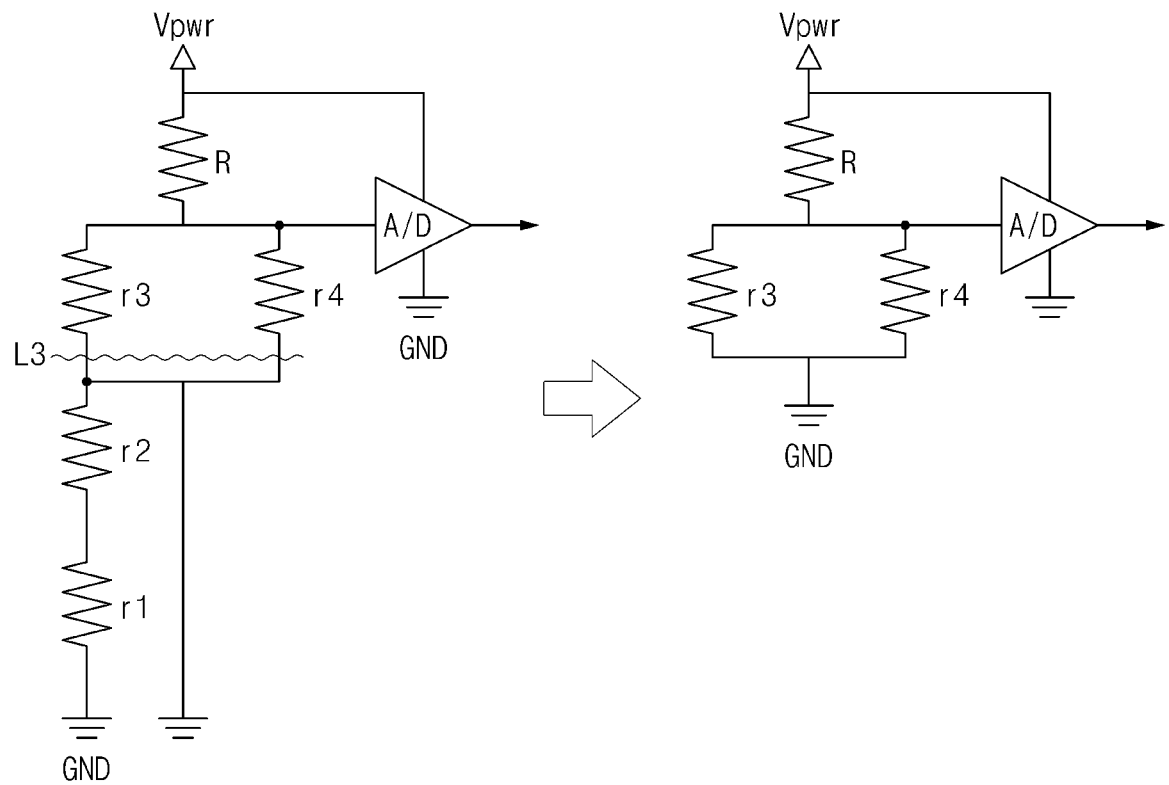

Accordingly, one form of a change of output voltage of the detection circuit unit according to the level of water flowing into the battery system will be referenced by a description of FIGS. 2 to 3D.

In FIG. 2, the resistance values of a first resistor r1, a second resistor r2, a third resistor r3, and a fourth resistor r4 may satisfy a condition of r1≥r2≥r3>>r4 or r3≥r2≥r1>>r4 to improve a detection precision of the level of the water.

As illustrated in FIG. 2, the first resistor r1, the second resistor r2, and the third resistor r3 are connected to each other in series, and then, one end of the first resistor is connected to a ground terminal and an opposite end of the third resistor is connected to the water inflow determining unit 160.

In contrast, one end of the fourth resistor r4 is in a floating state in which the one end of the fourth resistor r4 is not connected to the ground terminal, and an opposite end of the fourth resistor r4 is connected to the water inflow determining unit 160.

Accordingly, in a normal state in which water does not flow into the battery system, as in FIG. 3A, the detection circuit unit is a circuit including the first resistor r1, the second resistor r2, and the third resistor r3, except for the fourth resistor r4. Then, the first resistor module 140 have a series resistance value of the first resistor r1, the second resistor r2, and the third resistor r3, and the detection circuit unit outputs a voltage value corresponding to the series resistance value of the first resistor module device 140.

Here, an input voltage Vpwr is divided to the first resistor r1, the second resistor r2, and the third resistor r3, and an internal resistance R of the water inflow determining unit 160, and an output voltage has a reference voltage value of V0 by the first resistor r1, the second resistor r2, and the third resistor r3. Here, V0 may be represented as in Equation 1.

$$V0 = \frac{(r1+r2+r3)}{(r1+r2+r3)+R} \times V_{pwr} \qquad \text{[Equation 1]}$$

Meanwhile, when the water flowing into the pipe structure 110 reaches the first step water level L1, conductor 1-1 121 and conductor 2-1 131 are electrically short-circuited by the introduced water. Further, the first resistor r1 and the fourth resistor r4 are electrically short-circuited from the ground terminal.

When the conductor 121 and conductor 2-1 131 are short-circuited, as in FIG. 3B, the first resistor r1, the second resistor r2, and the third resistor r3 of the detection circuit unit are connected to each other in series, and the fourth resistor r4 of the detection circuit unit are connected in parallel to the first to third resistors r1, r2, and r3.

Then, the circuit detection unit outputs a voltage value corresponding to a combined resistance value of the resistance values of the first resistor module 140 and the second resistor module.

Here, the input voltage Vpwr is divided to the first to fourth resistors r1, r2, r3, and r4 and the internal resistor R of the water inflow determining unit 160, and the output voltage has a first voltage value of V1. Here, V1 may be represented as in Equation 2.

$$V1 = \frac{(r1 + r2 + r3)//(r4)}{\{(r1 + r2 + r3)//(r4)\} + R} \times V_{pwr} \quad \text{[Equation 2]}$$

Meanwhile, when the water flowing into the pipe structure 110 reaches the second step water level L2, conductor 1-2 122 and conductor 2-2 132 are electrically short-circuited by the introduced water. Further, the second resistor r2 and the fourth resistor r4 are electrically short-circuited from the ground terminal.

When the conductor 122 and conductor 2-2 132 are short-circuited, as in FIG. 3C, the second resistor r2 and the third resistor r3 of the detection circuit unit are connected to each other in series, and the fourth resistor r4 of the detection circuit unit are connected in parallel to the second resistor r2 and the third resistors r3.

Then, the circuit detection unit outputs a voltage value corresponding to a combined resistance value of the resistance values of the first resistor module 140 and the second resistor module.

Here, the input voltage Vpwr is divided to the second to fourth resistors r2, r3, and r4 and the internal resistor R of the water inflow determining unit 160, and the output voltage has a second voltage value of V2. Here, V2 may be represented as in Equation 3.

$$V2 = \frac{(r2 + r3)//(r4)}{\{(r2 + r3)//(r4)\} + R} \times V_{pwr} \quad \text{[Equation 3]}$$

Meanwhile, when the water flowing into the pipe structure 110 reaches the third step water level L3, conductor 1-3 123 and conductor 2-3 133 are electrically short-circuited by the introduced water. Further, the third resistor r3 and the fourth resistor r4 are electrically short-circuited from the ground terminal.

The conductor 123 and conductor 2-3 133 are short-circuited, as in FIG. 3D, the third resistor r3 and the fourth resistor r4 of the detection circuit unit are connected to each other in parallel.

Then, the circuit detection unit outputs a voltage value corresponding to a combined resistance value of the resistance values of the first resistor module 140 and the second resistor module.

Here, the input voltage Vpwr is divided to the third resistor r3 and the fourth resistor r4 and the internal resistor R of the water inflow determining unit 160, and the output voltage has a third voltage value of V3. Here, V3 may be represented as in Equation 4.

$$V3 = \frac{(r3)//(r4)}{\{(r3)//(r4)\} + R} \times V_{pwr} \quad \text{[Equation 4]}$$

Accordingly, the water inflow determining unit 160 determines that the state is a normal state when the measured voltage is V0.

Further, the water inflow determining unit 160 may determine that that state is a water inflow state when the measured voltage is V1 to V3, and may determine a level of the water according to the measured voltage value. Then, the water inflow determining unit 160 may perform a control corresponding to the determined level of the water.

As an example, the water inflow determining unit 160 may output a warning when it is determined that the level of the water is a first step water level. Meanwhile, the water inflow determining unit 160 may restrict output of battery power and switch off a high-voltage relay when the level of the water is a second step or third step water level.

Figure 4A:
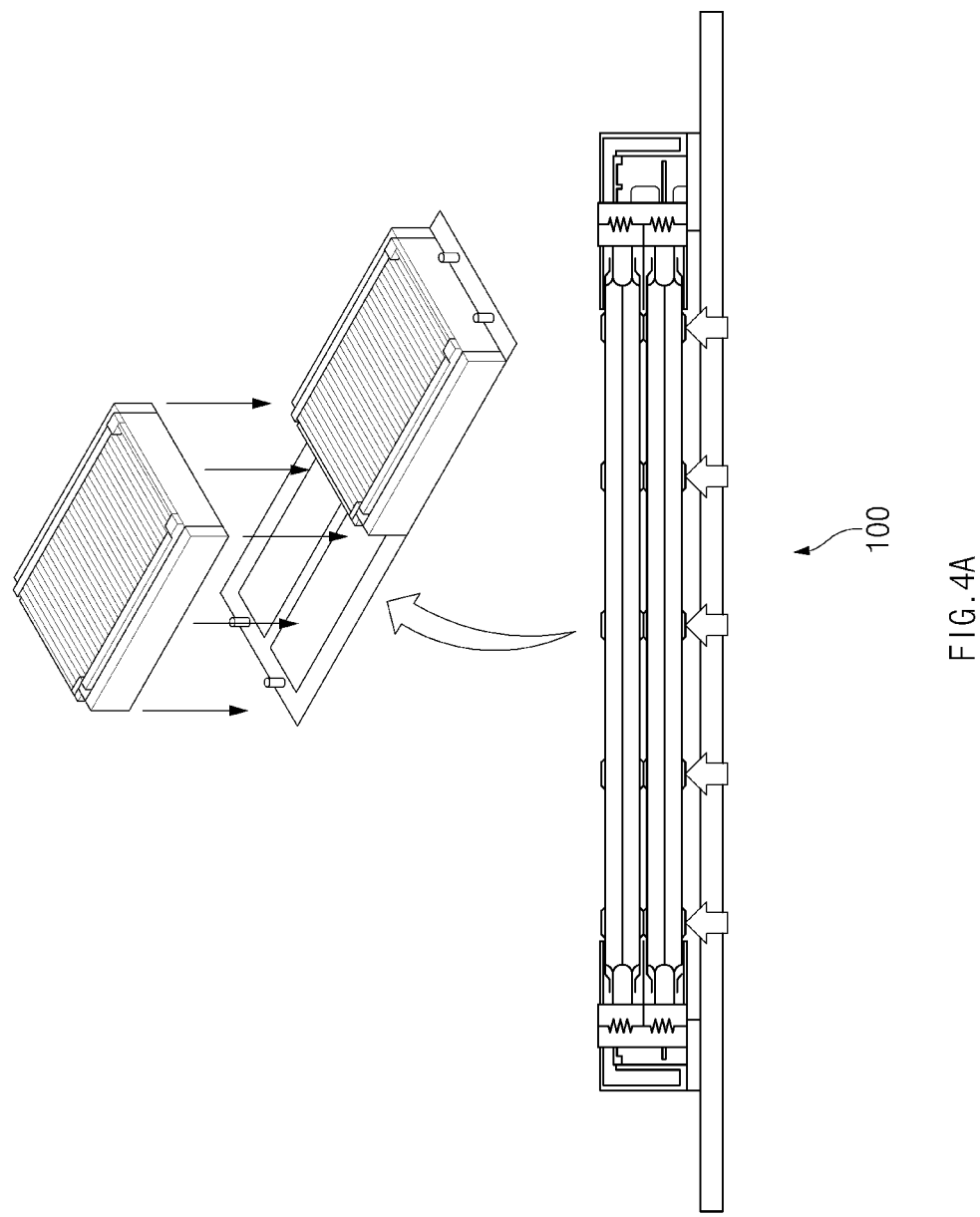
FIGS. 4A to 4C are views illustrating one form of disposition of an apparatus for detecting water flowing into a battery system.
Figure 4B:
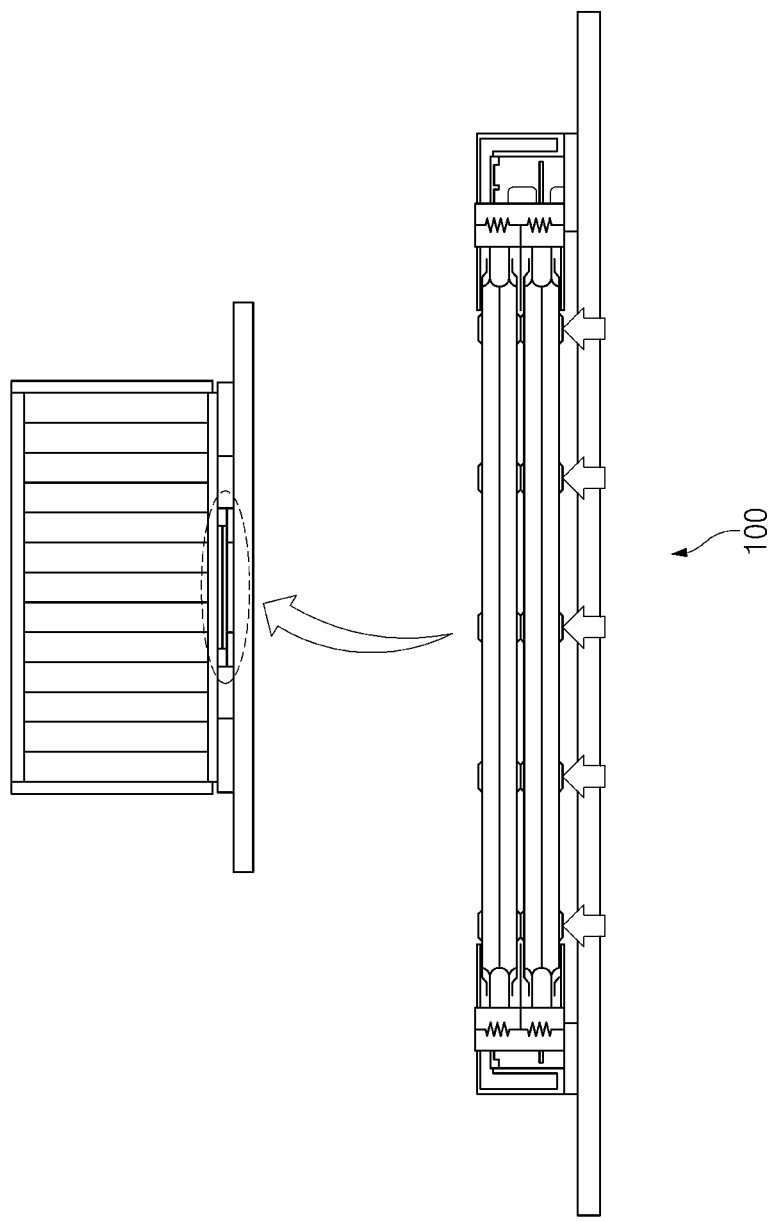
Figure 4C:
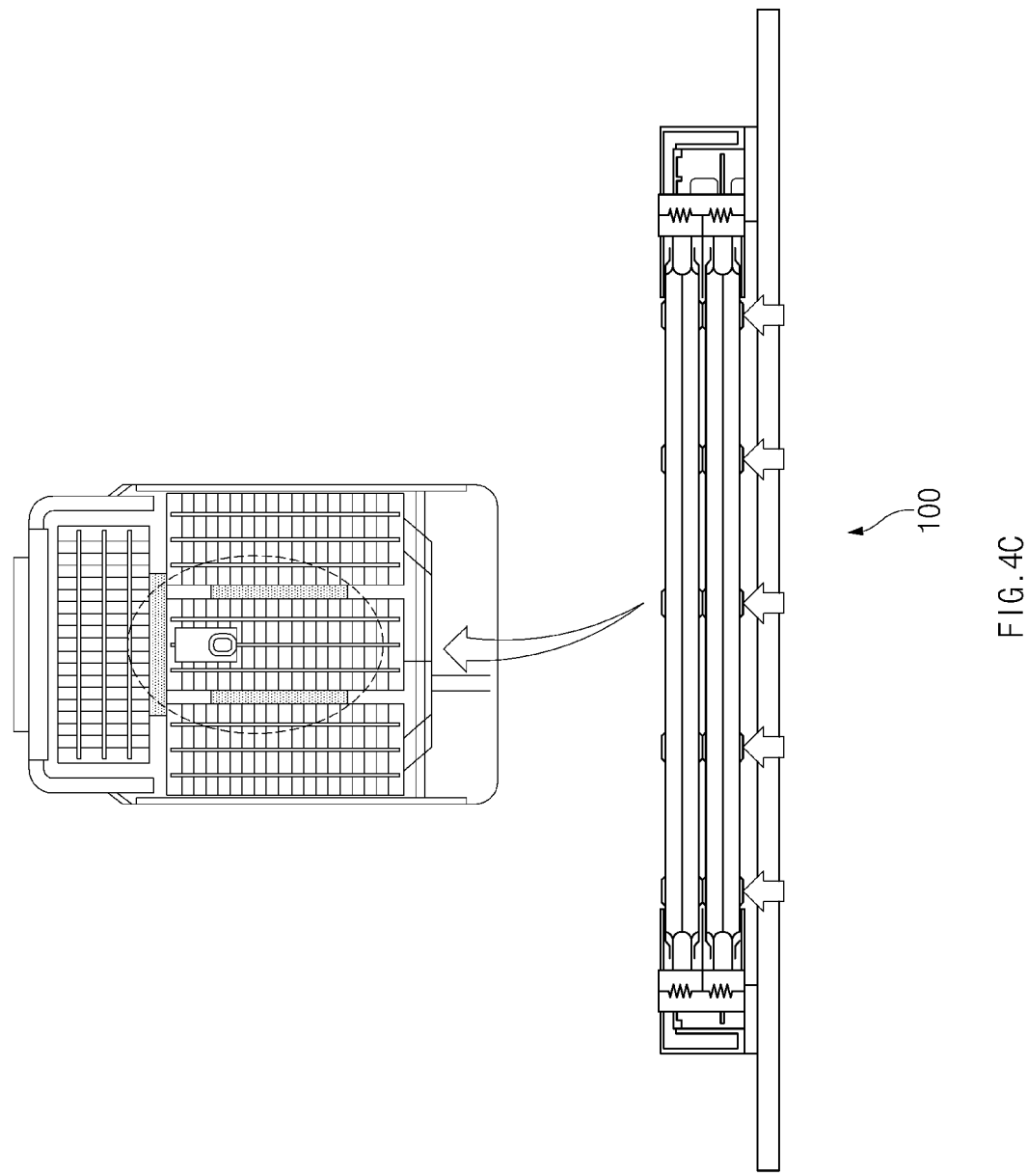

As in FIG. 4A, the water inflow detecting apparatus 100 or the detection circuit unit of the water inflow detecting device may be disposed on the entire surface of the lower bottom surface 1 of the battery module. Further, as in FIG. 4B, the water inflow detecting apparatus 100 or the detection circuit unit of the water inflow detecting device may be disposed in a partial space of the lower bottom surface 1 of the battery module. Further, as in FIG. 4C, the water inflow detecting apparatus 100 or the detection circuit unit of the water inflow detecting device may be disposed an empty space between the battery modules.

The water inflow detecting apparatus 100 according to the form, which is operated as mentioned above, may be realized in a form of a memory and an independent hardware device including a process that processes operations, and may be driven in a form in which the water inflow detecting apparatus 100 is included in another hardware device, such as a microprocessor or a general-purpose computer system. Further, the water inflow determining unit 160 of the water inflow detecting apparatus 100 according to the form may be realized as a processor.

An operational flow of the water inflow detecting apparatus according to the present disclosure will be described in detail.

Figure 5:
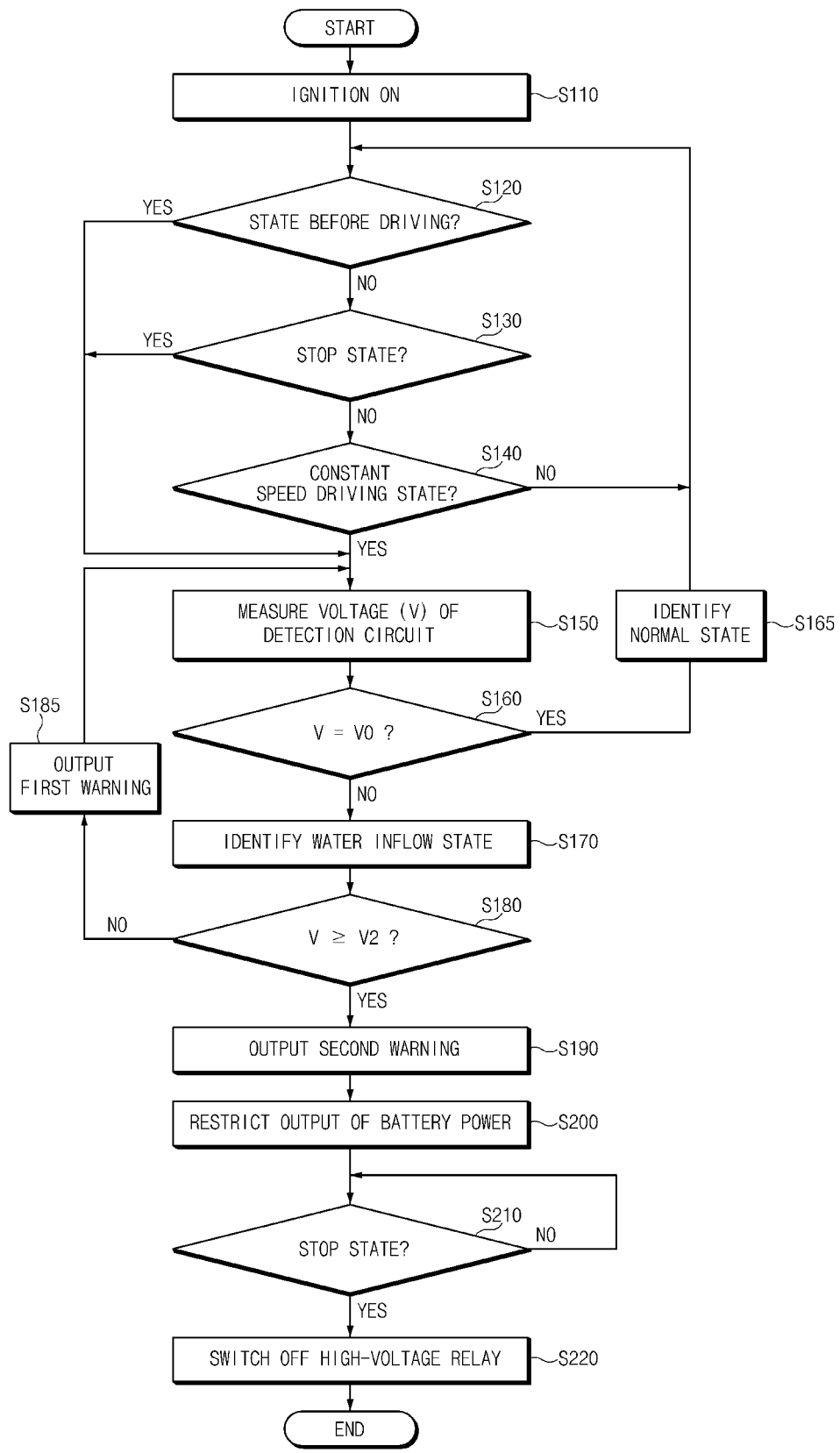
FIG. 5 is a flowchart illustrating an operation flow of a method for detecting water flowing into a battery system.

FIG. 5 is a flowchart illustrating an operation flow of a method for detecting water flowing into a battery system in one form of the present disclosure.

As illustrated in FIG. 5, when the vehicle is in a state before deriving (S120), a stop state (s130), or a constant speed driving state (S140) after the vehicle is ignited on (S110), the water inflow detecting apparatus 100 measures an output voltage V of the detection circuit unit (S150).

Although FIG. 1 illustrates that operation S150 is performed when the state of the vehicle satisfies any one of conditions of S120 to S140, the water inflow detecting apparatus 100 may perform operation S150 when the state of the vehicle is not any of a state before driving, a stop state, or a constant speed driving state.

The water inflow detecting apparatus 100 identifies a voltage value of a voltage V measured in operation S150.

When the measured voltage V of operation S150 has a reference voltage value V0, the water inflow detecting apparatus 100 determines that the water inflow state of the battery system is a normal state (S165).

Meanwhile, when the measured voltage V of operation S150 has a value that is not a reference voltage value V0, the water inflow detecting apparatus 100 determines the water inflow state of the battery system (S170).

Then, when the measured voltage V has a value that is smaller than the second voltage value V2, for example, the first voltage value V1 (S180), the water inflow detecting device 100 outputs a first warning (S185). In this case, the water inflow detecting apparatus 100 may output a message that guides that the water flowing into the battery system is a first step water level together.

Then, when the measured voltage V has a value that is equal to or larger than the second voltage value V2, for example, the second voltage value V2 or the third voltage value V3 (S180), the water inflow detecting device 100 outputs a second warning (S190). In this case, the water inflow detecting apparatus 100 may output a message that guides that the water flowing into the battery system is a second step water level or a third step water level together.

Further, the water inflow detecting apparatus 100 restricts output of battery power (S200), and when the vehicle is in a stop state (S210), the high-voltage relay is switched off (S230).

Figure 6:
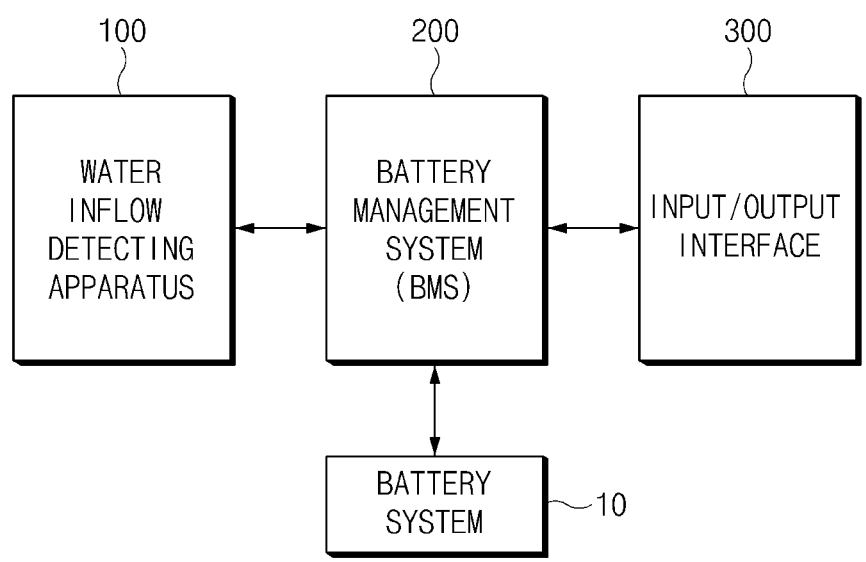
FIG. 6 is a block diagram illustrating a configuration of a vehicle system, to which an apparatus for detecting water flowing into a battery system is applied.

FIG. 6 is a block diagram illustrating a configuration of a vehicle system, to which an apparatus for detecting water flowing into a battery system is applied in one form of the present disclosure.

Referring to FIG. 6, the vehicle system includes a battery system 10 that provides an operation power source of a vehicle, a water inflow detecting apparatus 100 that detects a water inflow state into the battery system 10, a battery management system (BMS) 200 that manages and controls a state of the battery system 10, and an input/output interface 300 in communication with the BMS 200.

Here, the water inflow detecting apparatus 100 is the same apparatus as the water inflow detecting apparatus described in the forms of FIGS. 1 to 5, and a repeated description thereof will be omitted.

Although FIG. 6 illustrates one form in which the water inflow detecting apparatus 100 is realized outside the battery management system (BMS) 200, the water inflow detecting apparatus 100 may be realized in the interior of the battery management system (BMS) 200. Then, the water inflow detecting apparatus 100 may be integrally formed with the internal units of the battery management system (BMS) 200, and may be realized as a separate device to be connected to the units by connection means.

The water inflow detecting apparatus 100 may provide a water inflow detection result for the battery system 10 to the battery management system (BMS).

Then, the battery management system (BMS) 200 may output a warning through an input/output interface 300 according to the detection result of the water inflow detecting apparatus 100, and may output a message that guides a state of the battery system 10.

Further, the battery management system (BMS) 200 may output a control signal to the battery system 10 according to the detection result of the water inflow detecting apparatus 100. In one form, the battery management system (BMS) 200 may output an output restriction signal of a high-voltage battery, and may output an off control signal of the high-voltage relay.

According to the present disclosure, an accident that may occur due to water flowing into a battery system of a vehicle may be inhibited or prevented in advance by detecting water flowing into the battery system of the vehicle.

The above description is a simple exemplification of the technical spirit of the present disclosure, and the present disclosure may be variously corrected and modified by those skilled in the art to which the present disclosure pertains without departing from the desired features of the present disclosure.

Therefore, the disclosed forms of the present disclosure do not limit the technical spirit of the present disclosure but are illustrative, and the scope of the technical spirit of the present disclosure is not limited by the forms of the present disclosure. It will be understood that all the technical spirits within the equivalent range fall within the scope of the present disclosure.

What is claimed is:

1. An apparatus for detecting inflow of water into a battery system, the apparatus comprising:
   a detection circuit unit configured to output different voltage values based on a level of water flowing into the battery system; and
   a water inflow determining unit configured to measure a voltage value output from the detection circuit unit and to determine a water inflow state of the battery system based on the measured voltage value,
   wherein the detection circuit unit includes:
      a first water level detector including a plurality of first conductors disposed at different heights on a first side of a pipe structure;
      a second water level detector including a plurality of second conductors, where the second conductors of the plurality of second conductors are disposed at different heights on a second side of the pipe structure; and
      a first resistor module having a total resistance value which varies as the water flowing into the pipe structure reaches a water level corresponding to the heights of the plurality of first conductors.

2. The apparatus of claim 1, wherein the second conductors of the plurality of second conductors are disposed at the same height as the height of the first conductors of the plurality of first conductors.

3. The apparatus of claim 2, wherein a first conductor and a second conductor of the first water level detector and the second water level detector are respectively disposed at heights corresponding to the corresponding water levels, and are configured to be short-circuited when the level of the water flowing into the pipe structure reaches a specific water level.

4. The apparatus of claim 1, wherein the first resistor module includes a plurality of resistors disposed between the plurality of first conductors.

5. The apparatus of claim 4, wherein the resistors of the plurality of resistors are connected to each other in series.

6. The apparatus of claim 1, further comprising:
   a second resistor module including a resistor disposed above a second conductor, wherein the second conductor is disposed at an uppermost height among the plurality of second conductors.

7. The apparatus of claim 6, wherein the detection circuit unit is configured to output a voltage value corresponding to a combined resistance value of a resistance value of the first resistor module and a resistance value of the second resistor module based on a level of the water flowing into the pipe structure.

8. The apparatus of claim 1, wherein the detection circuit unit is configured to output a voltage value corresponding to a resistance value of the first resistor module when no water is flowing into the pipe structure.

9. The apparatus of claim 1, wherein the pipe structure includes a plurality of pipes disposed parallel to each other, and the plurality of pipes are communicated with each other in a vertical direction.

10. The apparatus of claim 1, wherein the water inflow determining unit is configured to determine a level of the water flowing into the battery system based on the measured voltage value, and configured to output a warning signal corresponding to the determined level of the water.

11. The apparatus of claim 10, wherein the water inflow determining unit is configured to restrict an output of battery power of the battery system based on the determined level of the water.

12. The apparatus of claim 10, wherein a relay of the battery system is switched off based on the determined level of the water.

13. A method for detecting inflow of water into a battery system, the method comprising the steps of:
outputting, by a detection circuit unit, different voltage values based on a level of water flowing into the battery system;
measuring, by a water inflow determining unit, the output voltage value;
determining, by the water inflow determining unit, a water inflow state of the battery system based on the measured voltage value,
wherein the detection circuit unit includes: a first water level detector including a plurality of first conductors, a second water level detector including a plurality of second conductors; and a first resistor module,
disposing the plurality of first conductors at different heights on a first side of a pipe structure;
disposing the plurality of the second conductors at different heights on a second side of the pipe structure; and
varying a total resistance value of the first resistor module as the water flowing into the pipe structure reaches a water level corresponding to the heights of the plurality of first conductors.

14. The method of claim 13, wherein the step of determining the water inflow state includes:
determining a level of the water flowing into the battery system based on the measured voltage value.

15. The method of claim 14, further comprising:
outputting, by the water inflow determining unit, a warning signal corresponding to the determined level of the water.

16. The method of claim 14, further comprising:
restricting, by the water inflow determining unit, output of battery power of the battery system based on the determined level of the water.

17. The method of claim 14, further comprising:
switching off, by the water inflow determining unit, a relay of the battery system based on the determined level of the water.

18. A vehicle system comprising:
a battery system configured to provide an operational power source of a vehicle;
a water inflow detecting device configured to measure a voltage value output from a detection circuit unit that outputs different voltage values based on a level of water flowing into the battery system and configured to determine a water inflow state of the battery system based on the measured voltage value; and
a battery management system configured to output a warning signal to an input/output interface based on the determined water inflow state of the battery system,
wherein the detection circuit unit includes:
a first water level detector including a plurality of first conductors disposed at different heights on a first side of a pipe structure;
a second water level detector including a plurality of second conductors, where the second conductors of the plurality of second conductors are disposed at different heights on a second side of the pipe structure; and
a first resistor module having a total resistance value which varies as the water flowing into the pipe structure reaches a water level corresponding to the heights of the plurality of first conductors.

19. The vehicle system of claim 18, wherein the battery system is configured to restrict an output of battery power of the battery system based on the determined water inflow state of the battery system and to switch off a relay of the battery system.

* * * * *